Figure 1:

INVENTORS
EUGENE EDWARD MAGAT
DAVID TANNER

BY *Carl A. Hechmer*

ATTORNEY

United States Patent Office 3,290,207
Patented Dec. 6, 1966

3,290,207
FIBRILLATED FIBER
Eugene Edward Magat and David Tanner, Wilmington, Del., assignors to E. I. du Pont de Nemours and Company, Wilmington, Del., a corporation of Delaware
Filed Aug. 22, 1962, Ser. No. 220,119
1 Claim. (Cl. 161—178)

This application is a continuation-in-part of United States application 830,744, filed July 31, 1959, which is a continuation-in-part of United States application No. 756,047, filed August 19, 1958, which, in turn, is a continuation-in-part of United States applications Nos. 550,031 and 503,791, filed April 7, 1955, and April 25, 1955, respectively.

This invention relates to product and process. More particularly it concerns a process for chemically adhering an addition polymerizable monomer to spongy and reticulated fibers produced from a fiber-forming polymeric 1-olefin and the graft copolymer product formed thereby.

Objects

It is an object of the present invention to provide a process for chemically grafting an addition polymerizable monomer to spongy and reticulated fibers or plexifilaments produced from a fiber-forming polymeric 1-olefin.

Another object is to provide a novel continuous strand of a polymeric 1-olefin having a reticulated structure of longitudinally oriented integrated fibrils by grafting an addition polymerizable, monomeric modifier thereto.

It is a still further object to provide a plexifilament of fiber-forming polymeric 1-olefin to which is grafted an addition polymerizable, monomeric modifier, useful in producing high-strength, moisture resistant paper.

These and other objects will become apparent in the course of the following specification and claims.

Statement of invention

In accordance with the present invention, a novel and useful product is provided by a process wherein a plexifilament produced from a fiber-forming polymeric 1-olefin, in intimate contact with an addition polymerizable, monomeric modifier, is subjected to ionizing radiation to produce chemical bonds between the plexifilament and the modifier. More specifically, an addition polymerizable monomeric modifier is applied to the surface of the plexifilament produced from a polymeric 1-olefin (for deep-seated modification, the monomer is permitted to diffuse into the substrate) and the structure is thereafter irradiated with ionizing radiation to induce chemical bonding.

Definitions

The plexifilament of polymeric 1-olefin is a three-dimensional fibrous integral plexus. The plexifilamentary strands generally fall into one of the classes:

(1) A fibrillated strand which is very fibrous in nature and is an open network of narrow ribbon-like elements or film-fibrils generally coextensively aligned with the longitudinal axis of the strand; and (2) a partially condensed strand having the structure of the fibrillated strand and containing densified sections of film-fibril layers. The latter class encompasses plexifilamentary strands in any of several forms termed monotubular, split tubular and ribbon or highly split tubular.

All of the strands are characterized morphologically by a three-dimensional network of film-fibril elements. These networks may exist in various forms, but in all cases the film-fibrils are extremely thin. On the average the film-fibril thickness determined as described below is less than 4 microns thick. In the preferred products the film-fibrils are less than two microns thick and may indeed have a thickness of less than 1 micron. The film-fibril elements are at least five times as wide as they are thick, the actual width being between about 1 micron and about 1,000 microns.

The fibrillated strand consists of a three-dimensional integral plexus of film-fibrils which are separated from each other lateral, and extend generally in a longitudinal direction along the length of the strand. The film-fibrils are interconnected at random intervals in both longitudinal and transverse directions to provide a three-dimensional network or lattice in which all elements are integral with each other. In some instances, it is possible to detect minor amounts of polymeric material present which is not in the form of film-fibrils but rather as small polymer masses and other forms. The quantity of this material is however insignificant and exerts no deleterious effects on the properties of the strand.

The fibrillated plexifilament is a soft, supple strand having the outward appearance of a bulky, staple spun yarn. When examined at 400X magnification, the fibrils have the appearance of ribbons of extremely thin pellicular material, folded or rolled approximately about the film-fibril axis. For this reason they appear to be fibrous when examined without magnification.

The monotubular strand comprises a tubular strand having a film-like outer wall and a fibrous interior. The outer wall which is not necessarily cylindrical is a fibrous skin comprising a dense laminate of film-fibrils. The fibrous nature of the outer wall can ordinarily be demonstrated by examination under a microscope, by working or by pressing a strip of cellophane adhesive tape against the plexifilament. Within the tube is a more open film-fibril network structure whose outer portion, i.e., that part closest to the tube wall, appears to be partially embedded in, connected to or a continuation of the plexifilament structure at the inside of the tube wall. Near the film wall on the inside of the tube, the film-fibrils are layered together in close association, but near the center of the strand, the film-fibrils are in a fairly open configuration. In some cases the film-fibrils on the inside of the tube criss-cross one another to form a diamond pattern, which is readily visible when the tube is cut open longitudinally. Often the center of the tube is open enough to allow free passage of air through a substantial length of the strand whenever one applies air pressure as by blowing through the strand. In other instances the material cannot be expanded by applying air pressure. A probe or dissecting needle simply punctures one of the walls when an attempt is made to separate the walls.

Despite the embedded nature of the film-fibrils in the monotubular species, the structure is nevertheless three-dimensional in nature and has the other characteristics of an integral film-fibril plexus. For example, this species has a surface greater than 2 m.²/g. and a film thickness less than 4 microns. The three-dimensional nature of the film-fibril network is obvious in longitudinal views of the fibrous interior. In addition, it is obvious when film-fibril elements are pulled from the inside wall of the structure that the elements are arranged in a three-dimensional network.

Strands of extremely high strength can be obtained by drawing some monotubular yarns. These may be knit or woven into fabrics of high strength. In addition, these strands may be beaten to produce fibrids as defined in Morgan U.S. Patent 2,999,788 with high strength in the wet-laid form.

The split tubular and highly split tubular or ribbon strands of this invention are closely analogous species. Whereas the monotubular strand appears to have a continuous skin or casing, the split tubular strand has one or more slits in the dense skin running in the machine direction of the strand, thus exposing portions of inner less dense network material. It is postulated that under spinning conditions more extreme than those employed with the monotubular strand, the solvent vapor escapes at such great velocity as to split the outer skin which forms. The split tubular strand as has its wall essentially intact. The ribbon strand, a name descriptive of its shape, presents an outward appearance of wall fragments of indefinite width and length interspersed with coarsely fibrillated material when examined under the microscope. It is believed to be formed by the complete rupture of a monotubular strand during spinning. Both of these species can be drawn to obtain strands of very high tenacity or can be beaten in an aqueous system to obtain fibrids suitable for use in making synthetic papers.

The plexifilament substrates are prepared by the flash-spinning process described and claimed in U.S. application Ser. No. 736,337 by H. Blades and J. R. White. The process of the Blades and White invention provides a yarn-like strand having the beneficial properties of both stable fiber yarns and continuous filament yarns. These strands have the bulk of staple fiber yarns but are substantially entirely without loose ends, and like continuous filament yarns have high strength even at zero twist. Plexifilaments are unlike both staple and continuous yarns in being unitary and no twist is necessary to hold a plexifilament together.

By the term "polymeric 1-olefin" is meant a high molecular weight polymer (i.e., in the fiber and film-forming range) obtained by polymerization of such 1-olefins as ethylene, propylene, butene, decene and the like. The term is also intended to include copolymers among these olefin components, as well as those copolymers in which a major proportion, preferably over 85%, is derived from the said 1-olefin monomers.

Linear, branched, isotactic, syndiotactic and atactic polymers are suitable, although the preferred polymers are those which are linear. High density, linear polyethylene is especially preferred, because of its strength as a textile. The polymers which are especially preferred are those which are fiber-forming. These polymers are comprehensively discussed by Flory in "Principles of Polymer Chemistry," Cornell Univ. Press, Ithaca, N.Y. (1953). The preferred 1-olefin polymers are those which are substantially linear, i.e., those which are produced from predominantly monoethylenically unsaturated monomers; however, branching may be present.

By "graft copolymer" is meant a polymer which is modified, after polymerizing and shaping, by chemically bonding thereto, molecules of a chemically dissimilar organic compound.

By "irradiation" is meant the process by which energy is propagated through space, the possibility of propagation being unconditioned by the presence of matter, as distinguished from mere mechanical agitation in a material medium such as is characteristic of energy produced by a sonic or ultrasonc transducer, although the speed, direction and amount of energy transferred may be thus affected.

By "ionizing radiation" is meant radiation having sufficient energy to remove an electron from a gas atom, forming an ion pair; this requires an energy of about 32 electron volts (e.v.) for each ion pair formed. This radiation has sufficient energy to non-selectively break chemical bonds; thus, in round numbers radiation with energy of 50 electron volts (e.v.) and above is effective for the process of this invention. The ionizing radiation of the process of this invention is generally classed in two groups: high energy particle radiation and ionizing electromagnetic radiation. The effect produced by these two types of radiation is similar, the essential requisite being that the incident particles or photons have sufficient energy to break chemical bonds and generate free radicals.

The preferred radiation for the practice of this invention is high energy ionizing radiation, and has an energy equivalent to at least 0.1 million electron volts (m.e.v.). Higher energies are even more effective; there is no known upper limit, except that imposed by available equipment.

"Additional polymerizable" or "vinyl" as used herein is intended to include those organic compounds which have aliphatic unsaturation, and which may be employed to form addition homopolymers. Also included are those unsaturated compounds which, although not themselves homopolymerizable (e.g., maleic acid), copolymerize with other vinyl monomers. The term is also intended to include compounds with acetylenic unsaturation.

*Drawings*

Figure 2:
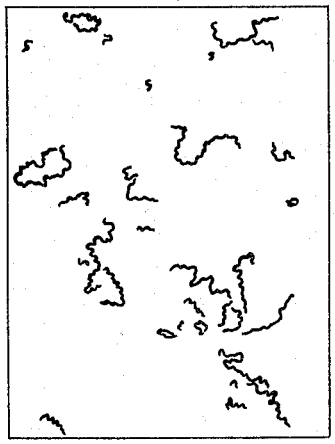
Figure 3:
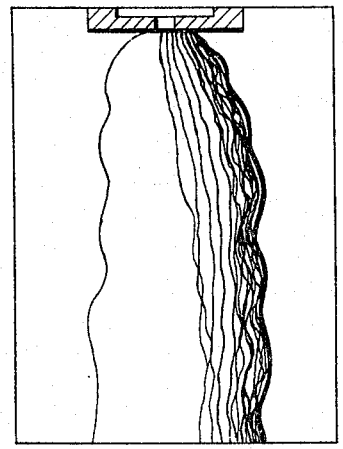

A better understanding of the structure of the yarn-like strands of this invention may be obtained by reference to the drawings. FIGURE 1 is a longitudinal view of a fibrillous plexifilament characterized by innumerable fibrils 1 and substantially no longitudinal tunnels. FIGURE 2 is a cross-sectional view of the structure of FIGURE 1 (magnified about 420X). FIGURE 3 shows a plexifilament being flash spun.

*Experimental procedures and units*

Compositions are given in parts by weight or weight percent, unless otherwise noted.

The irradiation in many of the examples is carried out using a Van de Graaff electron accelerator with an accelerating potential of 2 million electron volts (m.e.v.) with a tube current of 250 to 290 microamperes. Samples to be irradiated are placed on a conveyor and traversed back and forth under the electron beam at a distance of tube window to sample of 10 cm. The conveyor speed is 40 inches per minute. At the sample location the irradiation intensity is 12.5 watt sec./cm.$^2$ of sample which is approximately equivalent to an available dose per pass of one mrad.

Radiation dosages are given in units of "mrad" (millions of rads), a "rad" being the amount of high energy radiation of any type which results in an energy absorption of 100 ergs per gram of water or equivalent absorbing material.

The static propensity of the fabric is indicated in terms of direct current resistance in ohms per square, measured parallel to the fabric surface, at 78° F. in a 50% relative humidity atmosphere. High values, reported as the logarithm (to the base 10) of the resistivity (log R) indicate a tendency to acquire and retain a static charge. A meter suitable for this determination is described by Hayek and Chromey, American Dyestuff Reporter, 40, 225 (1951).

Wickability as measured in the examples is determined by placing a drop of water upon the fabric, and measuring the diameter of the wet spot after a standard time interval, e.g., 60 seconds. Alternatively, especially useful where decreased wickability is obtained, is a determination of the length of time required for a drop placed upon the fabric to disappear by soaking into the fabric.

Crease recovery is evaluated by crumpling a fabric in the hand, and observing the rate at which it recovers from this treatment. Wet crease recovery indicates the rate and extent of disappearance of creases from the crumpled fabric when it is wetted. Numerical values are obtained using the Monsanto Crease Recovery Method, described as the "vertical strip crease recovery test" in the American Society for Testing Materials Manual, Test No. D1295–53T. In determining wet crease recovery by this method, the specimens are soaked for at least 16 hours in distilled water containing 0.5% by weight of "Tween 20," a polyoxyalkylene derivative of sorbitan monolaurate, a wetting agent marketed by the Atlas Powder Company, Wilmington, Delaware. Immediately prior to testing, excess water is removed from the test fabrics by blotting between layers of a paper towel. Results are reported as percent recovery from a standard crease in 300 seconds.

The following examples are cited to illustrate the invention. They are not intended to limit it in any manner. Al "parts" referred to in the examples are parts by weight.

EXAMPLE 1

Thirteen parts of linear polyethylene of 0.5 melt index and 87 parts of methylene chloride are charged to an autoclave, and are heated for 4 hours at 190–195° C. with stirring. The autogenous pressure is about 500 p.s.i. Following the heating-dissolving step, a gate valve at the bottom of the autoclave is opened and the solution is flash-extruded through an extrusion orifice which is 86 mils in diameter and 86 mils long. The flash-spun product is a plexifilament structure characterized by a plurality of fibrils which unite and separate at random longitudinal and cross-sectional intervals throughout the strand to provide a three-dimensional unitary network or web in which all elements are all integral with each other. Thus, it resembles very closely a staple fiber yarn without loose ends.

A portion of the as-spun yarn is drawn threefold while traversing a bath of ethylene glycol heated to 130–133° C. Fabrics are woven from the undrawn yarn, which has a denier of 700 to 1100, and from the drawn yarn, which has a denier of 200 to 300.

Portions of these fabrics are treated as indicated in Table I by soaking in acrylic acid solution for a period of 2 hours at room temperature; the fabrics, still wet with the treating solution, are sealed in polyethylene bags, and are irradiated to a dose of 2 mrad, using 2 m.e.v. electrons as described hereinabove. After irradiation, the fabrics are scoured two times in methanol on a steam bath, followed by rinsing in hot distilled water at 70° C., followed in turn by treatment for 40 minutes in a 2% sodium carbonate solution at 70° C. The sodium carbonate treatment forms the sodium salt of the grafted acrylic acid. Excess sodium carbonate is removed by rinsing in hot water at 70° C. A weight gain for each sample is also indicated in Table I.

TABLE I

| Sample | Yarn | Treating Solution | Wt. Gain, Percent |
|---|---|---|---|
| A | Undrawn | 20% acrylic acid in heptane | 24.5 |
| B | Drawn | do | 17.2 |
| C | do | 30% acrylic acid in heptane | 32.8 |
| D | Undrawn | 20% acrylic acid in water, 0.1% sodium salt of lauryl alcohol sulfate. | 5.6 |

Fabric tests upon sample C show that it is highly resistant to hole melting. For example, a lighted cigarette cannot be pushed through the fabric, and the fabric is still pliable after cooling. Fabric from unmodified polyethylene melts immediately. The sodium acrylate-grafted fiber does not break when held directly over a lighted cigarette under considerable tension whereas an unmodified yarn breaks immediately under the same conditions. In addition, the modified fabric has increased dyeability, improved hand, and better dry and wet crease recovery.

EXAMPLE 2

A second batch of yarn is prepared as in Example 1, starting with a 13% solution of linear polyethylene of melt index 0.5, as before. When the polymer is dissolved, the autoclave pressure is increased to 650 p.s.i., using nitrogen from a pressure cylinder. The yarn is flash-spun as before, except that, prior to extrusion, the solution is filtered through a series of stainless steel screens. The fiber has a tenacity of about 1.3 g.p.d.

About 20 grams of the undrawn fiber prepared as described above is placed in a 1 gallon polyethylene bag containing 400 ml. of an 8% solution of acrylic acid in heptane. The fiber is soaked for 2 hours at room temperature, and then the bag containing the solution and fiber is irradiated in two passes (once from each side) to a total dose of 2 mrad.

The irradiated fiber is washed in cold methanol, then in hot methanol, followed by rinsing in distilled water at 70° C. The grafted fiber is then heated for 40 minutes in 5% aqueous sodium carbonate at 70° C., followed by two rinses in hot distilled water to remove excess sodium carbonate. The fiber is then dried, and the weight gain, due to grafted sodium acrylate, is found to be 58.5%.

The grafted plexifilament coded 2A is cut into pieces approximately ¼″ long and is then stirred briefly in a Waring Blendor with sufficient distilled water to form a 1% suspension without use of dispersing agent or thickener. An equal weight of kraft cellulose paper pulp is added, and is dispersed in the water. The dispersion is then diluted to make a suspension containing a 0.25% by weight total fiber, and paper is formed by depositing the furnish on a 100-mesh screen to make a hand sheet. The sheet is removed from the screen, and is dried at 110° C., allowing shrinkage to take place. The sample is then calendered in a press at 150° C. and 600 p.s.i. for 1 minute. A comparative control, 2B, is similarly prepared, using polyethylene plexifilaments which have not been grafted. A nonyl phenyl capped polyethylene oxide wetting agent is used in dispersing the fiber in water.

Following the above procedure, a sheet of 100% kraft pulp, 2C, is prepared as a second control. The samples are then tested, with the results shown in Table II.

TABLE II

| Sample | 2A | 2B | 2C |
|---|---|---|---|
| Composition, parts: | | | |
| Polyethylene fiber, grafted | 50 | 0 | 0 |
| Polyethylene fiber, unmodified | 0 | 50 | 0 |
| Kraft pulp | 50 | 50 | 100 |
| Tensile Strength [1] (lbs./in./oz./yd.[2]) | 13.3 | 6.4 | 12.8 |
| Break Elongation, percent | 14 | 6 | -------- |
| Frag Engegy,[2] kg./m | 0.360 | 0.086 | 0.085 |
| Water Vapor Permeability,[3] gm./m.[2]/24 hr. | 5.0 | 44 | 890 |
| Abrasion Resistance, cycles [4] | 120,000 | -------- | 590 |
| M.I.T. Fold Endurance, cycles [5] | 421,000 | -------- | 1,600 |
| Drop Penetration, Minutes: | | | |
| Water [6] | 8 | 0.6 | -------- |
| Oil | ([8]) | 3 | -------- |
| Drops to Break [7] | 30 | 8 | -------- |

[1] Tensile strength measured using an Instron Tensile Tester.
[2] Determined on the Frag Tester, sold by the Testing Machine Co., N.Y., N.Y.
[3] Permeability measured using Thwing Vapometer cup.
[4] Tabor abrasion test.
[5] TAPPI Standards T-423-M-50.
[6] Time in minutes for a drop to wet the paper.
[7] No. of 3 ft. drops required to break a two ply bag containing 80 lbs. of salt.
[8] None in 30.

These results show that the grafted polyethylene filaments, when added to kraft pulp, yield a paper which is stronger than 100% kraft, has greatly improved energy absorption (frag energy), which is a measure of a resistance to bursting when a bag containing heavy articles is dropped, and in addition is highly resistant to permeability to water vapor, resistant to abrasion and to repeated folding.

In addition, the paper prepared from grafted polyethylene plexifilaments provides not only a barrier for water and water vapor, but also is substantially impenetrable to oil, thus providing a valuable and unexpected combination of properties.

Although this example employed a 60% graft of sodium acrylate to the polyethylene fiber, other amounts are also suitable. For example, from 10 to 120% or more produces desirable modification. Other ions may also be used to form the salt of the acrylic acid graft, although sodium ion is preferred.

Many other unsaturated organic acids are useful in modifying addition polymer filaments to improve their utility, for example, for making paper. Thus, the unsaturated monocarboxylic acids such as acrylic acid and methacrylic acid are suitable; for some purposes, difunctional acids such as maleic, fumaric, and the like may be employed, although acids which are not homopolymerizable may require an excessive radiation dose. In addition, styrene sulfonic acid, ethylene sulfonic acid and the like are suitable for special purposes. It may sometimes be desirable to graft the acid as the preformed salt, e.g., as sodium acrylic, sodium styrene sulfonate, etc.

EXAMPLE 3

The irradiation grafted polyethylene plexifilament of the above example is cut into ¼" pieces, slurried in soft water to a consistency of 0.5% and subsequently beaten in a Waring Blendor at a 1% solids consistency for 2 minutes without the use of a detergent. A hand sheet is prepared from the polyethylene plexifilaments alone. The wet hand sheet is removed from the 100-mesh 8" x 8" screen, dried at 110° C. in an oven and subsequently pressed at 150° C., and 60 p.s.i. for 60 seconds. The sheet has a basis weight of 2.35 oz./yd.$^2$, a tensile strength of 13.8 lbs./in./oz./yd.$^2$ of which it retains 5.1 lbs./in./oz./yd.$^2$ when wet, and a tongue tear strength of 0.1 lbs./oz./yd.$^2$ A kraft paper sheet control is employed in observing the properties reported in Table III.

TABLE III

| | Sample | Control |
|---|---|---|
| Frag energy, kg./m | 0.94 | 0.08 |
| H$_2$O vapor permeability, g./m.$^2$/24 hrs | 5 | 700 |
| H$_2$O resistance (time in sec. for H$_2$O to permeate) | 1,200 | 2 |

EXAMPLE 4

A 0.98 gram sample of flash spun linear polyethylene, prepared as in Example 2 is soaked in a solution of 4 ml. of acrylic acid and 36 ml. of heptane overnight and irradiated for a dosage of 2 mrads under a Van de Graaff electron generator while still in the soaking solution. The sample is washed in methanol and then in a 2% sodium carbonate solution at 85° C. for 45 minutes followed by rinsing and drying. The weight gain is 107%. When a sample of melt spun undrawn linear polyethylene is treated under similar conditions the weight gain is only 7%.

EXAMPLE 5

A sample of flash spun polyethylene is soaked overnight in 13 ml. of distilled n-vinylpyrrolidone and 28 ml. of methanol and then irradiated as in Example 4. The sample is washed in distilled water at 85° C. for 45 minutes and rinsed. After drying the weight gain is 16.8% compared with 0.5% for melt spun linear polyethylene treated in a similar manner.

The grafted plexifilament is rapidly and deeply dyeable, whereas the melt-spun control is almost undyeable.

EXAMPLE 6

Flash-spun polyethylene is soaked overnight in 20 ml. of acrylonitrile and 20 ml. of heptane and irradiated as in Example 4. The sample is washed in methanol and in dimethylformamide on a steam bath, rinsed in water and dried. The weight gain for the flash-spun plexifilaments is 23.7% compared with 3.8% for the melt-spun material.

The grafted plexifilaments show improved weather resistance compared with a melt-spun control and with the ungrafted flash-spun polyethylene.

EXAMPLE 7

Flash-spun polyethylene is soaked in 20 ml. of distilled methylacrylate and 20 ml. of heptane overnight and irradiated as in Example 4. The sample is washed in hot methanol and in hot methyl ethyl ketone. The graft weight gain is 50% compared with 17% for the melt spun polyethylene yarn.

EXAMPLE 8

A flash-spun polyethylene sample is soaked overnight in 20 ml. of distilled styrene and 20 ml. of heptane and irradiated for a dosage of 2 mrads. The sample is washed in benzene at 60° C. and dried. The weight gain is 60.9% compared with 13% for the melt-spun sample.

EXAMPLE 9

Thirty grams of isotactic polypropylene (melt index 0.8) is charged to a 300 ml. autoclave along with 120 ml. methylene chloride. The autoclave is sealed and the mixture is heated to 185° C., dissolving the polymer. The solution is then flash-spun under autogenous pressure through a spinneret orifice 28 mils in diameter by 23 mils long. A plexifilamentary fibrous yarn is obtained, having a total denier (not drawn) of 230 to 330.

Eleven grams of the flash-spun polypropylene plexifilaments are soaked in a solution of 24 ml. of acrylic acid and 276 ml. of heptane for 2 hours, then irradiated for a dosage of 2 mrads. After washing successively in methanol, 2% sodium carbonate solution at 85° C. for 45 minutes and rinsing, the weight gain is 54.5%. A sample of melt spun material treated under similar conditions shows a weight gain of only 8.4%.

EXAMPLE 10

Ten grams of flash-spun polypropylene modified with sodium acrylate as in Example 9 is cut to ¼" length and is beaten in a Valley beater with 40 g. of kraft pulp to a Schopper Riegler freeness of 350. Papers are prepared from this slurry in a sheet mold box by pouring 593 ml. of the slurry with 1 liter of water into the box and applying a vacuum. The sheet is then couched onto a blotter and dried in an oven without tension. The papers are pressed at 150° C. for 1.5 minutes at 80 p.s.i.

The properties of the paper are listed in Table IV, along with the kraft paper of Example 2 for comparison.

TABLE IV

| | Sample | Control |
|---|---|---|
| Composition, parts: | | |
| Grafted polypropylene | 20 | 0 |
| Kraft pulp | 80 | 100 |
| Tensile Strength (lbs./in./oz./yd.$^2$) (dry) | 11.2 | 12.8 |
| Water Vapor Permeability, gm./m.$^2$/24 hr | 27 | 890 |

In addition, the test paper was more resistant to bursting under impact load, to folding and to abrasion.

EXAMPLE 11

A mixture of ethylene and octene-1 is copolymerized to give a copolymer containing 3 to 4% octene-1, having a density of 0.939 and a melt index of 1.1. This copolymer is flash spun as in Example 2 to give the monotubular structure of the highly split variety, as described hereinafter. Five gm. of this copolymer is sealed in a polyethylene bag with 10 ml. acrylic acid and 90 ml. heptane. After soaking 2 hours, the sealed bag is irradiated with 2 m.e.v. electrons to a dose of 1 mrad. After standing ½ hour, the sample is washed twice in boiling methanol, once in cold water, and is then steeped at 90° C. in an excess of 2% sodium carbonate in water for 1 hour. The sample is rinsed twice in hot water, dried and weighed. A weight gain of 30% is observed. The product has decreased static propensity, increased resistance to melting and improved dyeability as compared to unmodified control.

EXAMPLE 12

This example shows the unexpected ability for flash-spun plexifilaments to graft many times as much monomer as will dissolve in massive (film) polyethylene substrate.

Linear polyethylene film samples (20 mil film) are soaked in aqueous acrylic acide solutions of 10 to 100% and at temperatures of 25, 60 and 80° C. After soaking for up to five days, surface acid solution is wiped from the sample, and the absorbed acid is soaked from the film and determined by titration. The maximum acid content is 2.1% of the film weight, obtained by soaking in 100% acrylic acid at 60° C.

Flash-spun plexifilaments of substantially the same polyethylene used in the previous film test are soaked for five days in 100% acrylic acid at 60° C.; the filaments are removed from the solution, placed between sheets of blotting paper and passed through a hand clothes wringer set at maximum pressure. This sample is then irradiated to a dose of 1 mrad, after which the filament are washed twice in hot methanol, and three times in hot (over 85° C.) distilled water (45 minutes for each washing). After drying, the weight gain is found to be 267%. It is, therefore, apparent that a single exposure to a given irradiation dose is suitable to graft over two-hundred times as much acrylic acid to flash-spun plexifilaments as that amount which will dissolve in the polymer.

*Preparation of plexifilaments*

The plexifilaments employed in the process of the present invention are produced by "flash spinning" a homogeneous solution comprising a synthetic fiber-forming polymer in an organic liquid which is a solvent for the polymer at the elevated temperature employed; typical conditions are shown in Examples 1, 2 and 9. The solution is extruded from a vessel maintained at a temperature above the normal boiling point of the organic liquid and at superatmospheric pressure, through a spinneret containing one or more holes into a medium at a lower pressure, preferably air at normal atmospheric pressure. Temperature and pressure conditions in the extrusion vessel should be sufficiently high so that most of the solvent is flashed off immediately upon opening of the valve, i.e., immediately upon relief of pressure on the confined solution. This valve is a part of the spinneret assembly and may be located ahead or behind the orifice. The process of the present invention, in contrast to known solution spinning processes, operates at an extrusion temperature (temperature of the solution immediately prior to extrusion) substantially above the boiling point of the spinning solvent utilized, and preferably at least 40° C. above the boiling point of the solvent so that most of the solvent is flashed-off upon extrusion. Extremely high spinning speeds are attained normally being in excess of about 5000 y.p.m. per orifice. Productivity of about 13,000–15,000 yards of filamentary material per minute per hole are obtainable.

Flashing-off of solvent during the spinning process of this invention is much like the flash evaporation of solvent in well-known flash distilation procedures. The rapid and substantial reduction in pressure upon the confined polymer solution when the extrusion orifice is opened results in an almost violent escape of solvent, causing multitudinous longitudinal ruptures of extruded polymer and resultant production of the integral fibrous plexus. It is surprising that, despite the violent nature of the process, indefinitely continuous strands are obtained.

As mentioned above, the extrusion vessel is kept at a temperature above the boiling point of the liquid used and at superatmospheric pressure. Autogenous or higher pressures may be employed.

It is important that the polymer solution to be extruded contain at least 5% polymer by weight and that temperature and pressure within the extrusion vessel be controlled as explained above. If the concentration of polymer solution is too low for the particular spinneret assembly used, the polymer extruded is blown apart and the continuous product is not obtained. If in the same assembly the solution temperature is too high, the extruded polymer may be fused or blown apart depending on the thermal properties of the solvent. Conversely, if polymer solution concentration is too high or the temperature of the solution in the extrusion vessel is too low for the particular spinneret assembly used, a foamy, non-fibrillous product is obtained. It is also important that the polymer solvent utilized have a boiling point substantially lower than the melting point of the polymer and possess a substantial vapor pressure at the extrusion temperature if the structure of the instant invention is to be produced.

Suitable liquids for use in forming the high temperature, high pressure polymer solutions required for forming the plexifilaments should preferably have the following characteristics: (a) a boiling point at least 25° C. below the melting point of the polymer used; (b) it should be substantially unreactive with the polymer during extrusion; (c) it should be a solvent for the polymer under the temperature and pressure conditions suitable in this invention as set forth below; (d) it should dissolve less than 1% of the high polymeric material at or below its normal boiling point; and (e) the liquid should form a solution which will undergo rapid phase separation (i.e., in less than .01 second) upon extrusion forming a non-gel polymer phase, i.e., a polymer phase containing insufficient residual solvent to plasticize the structure. In these requirements, the process differs radically from conventional solution spinning techniques, wherein the spinning solvent is invariably a solvent for the polymer below the normal boiling point and generally is a solvent at room temperatures.

*Polymer substrates*

The polymers from which the plexifilaments are prepared are poly(1-olefins) and are produced by polymerization of ethylene, propylene, 1-butene, 1-octene, 1-decene and their corresponding copoly(1-olefins). The preferred polymers are the poly(lower olefins), such as polyethylene and polypropylene. Linear, branched, isotactic, syndiotactic and atactic types are suitable; the linear variety is preferred. Block and graft copolymers may often be employed. In addition, melt blends of these polymers with each other may be employed. Minor amounts of other polymer components may be present, copolymerized with the poly(1-olefin) or as a polymer mixture. Such additives may be employed to improve dyeability, soil repellence, flammablity, antistatic properties, specific absorbtivity, adhesion, resilience, stiffness, melt resistance and the like.

*Operable modifiers*

Among suitable materials for use as addition polymerizable modifiers are hydrocarbons such as ethylene, propylene, styrene, α-methyl styrene, divinyl benzene, 1,3-butadiene, 2,3-dimethyl-1,3-butadiene, 2-chloro-2,3-butadiene, isoprene, cyclopentadiene, chloroprene; acids such as maleic acid, crotonic acid, dichloromaleic acid, furoic acid, acrylic acid, methacrylic acid, undecylenic acid, cinnamic acid; amides such as acrylamide, methacrylamide, N-methylolacrylamide, N-methyl, N-vinyl formamide, N-vinyl pyrrolidone, methyl substituted N-vinyl pyrrolidone, vinyl oxyethyl formamide, methylene-bis-acrylamide, N-allyl-caprolactam; acrylate esters such as methyl acrylate, ethyl acrylate, benzyl acrylate, octyl acrylate, methyl methacrylate, butyl methacrylate, vinyl acrylate, allyl acrylate, ethylene diacrylate, diallyl itaconate, diethyl maleate, N,N-diethylaminoethyl methacrylate, dihydroxy dipyrone; nitriles such as acrylonitrile, methacrylonitrile; acrylyl halides such as acrylyl chloride; vinylic alcohols such as allyl alcohol, furfuryl alcohol, 3-hydroxycycopentane, dicyclopentenyl alcohol, tropolone; aldehydic compounds such as acrolein methacrolein, crotonaldehyde, furfural, acrolein diethyl acetal; vinyl amines such as vinyl pyridine, allyl amine, diallyl amine, vinyloxyethylamine, 3,-3-dimethyl-4-dimethylamino-1-butene, N,N-diacryltetramethylene diamine, N,N-diallyl melamine, di-amino octadiene; quaternized amines such as tetraallyl ammonium bromide, vinyl trimethyl ammonium iodide, the quaternary methiodide of methylene-3-aminomethyl-cyclobutane; vinyl esters such as vinyl acetate, vinyl salicylate, vinyl stearate, allyl formate, allyl acetate, diallyl adipate, diallyl isophthalate; vinyl ethers such as allyl glycidyl ethers, vinyl 2-chloroethyl ether, dihydropyrane, methoxy polyethyleneoxymethacrylate; vinyl halides such as vinyl chloride, vinyl fluoride, tetrachloroethylene, tetrafluoroethylene, 1-,1-dichloro-2,2-difluoroethylene, vinylidene chloride, hexachloropropene, hexachlorocyclopentadiene, p-chlorostyrene, 2-,5-dichlorostyrene, allyl bromide, 2-bromoethyl acrylate, vinyl tetrafluoropropionate, 1-,1-, 7-trihydroperfluoroheptylacrylate; isocyanate type compounds such as vinyl isocyanate, acrylyl isocyanate, allyl isothiocyanate; vinyl ketones such as methyl vinyl ketone, ethyl vinyl ketone; cyanides such as methacrylyl cyanide, allyl isocyanide; nitro compounds such as 2-nitropropene, 2-nitro-1-butene; phosphorous containing vinyls such as diethyl vinyl phosphate, diphenyl vinyl phosphine oxide, 1-phenyl-3 phosphacyclopentene-1-oxide, diallyl benzene phosphonate, potassium vinyl phosphonate, bis-chloroethyl vinyl phosphonate; also included are alkyl, aryl, aralkyl phosphonates, phosphites and phosphonates; sulfur containing vinyls including sulfonates, sulfonamides, sulfones, sulfonyl halides; thiocarboxylates, such as diallyl sulfide, ethylene sulfonic acid, allyl sulfonic acid, methallyl sulfonic acid, styrene sulfonic acid, 2-methylpropene-1,3-disulfonic acid, also including salts and esters of the sulfonic acids; epoxy vinyls, such as butadiene oxide, glycidyl methacrylate.

Acetylenes such as phenylacetylene, acetylene dicarboxylic acid, propiolic acid, propargylsuccinic acid, propargyl alcohol, 2-methyl-3-butyn-2-ol, 2,2,3,3-tetrafluorocyclobutylvinylethylene and the like may be used successfully.

Structure of graft copolymer product

The process of this invention produces a polymeric structure which has been termed a graft copolymer, that is, a polymer in which a modifying agent is grafted by chemical bonds, usually as a side chain, to the parent polymeric substrate.

Conventional copolymers, consisting of monomer species A and B, have a random distribution along the backbone of the polymer molecule, and may be represented schematically thus:

—AAABBABBBABAA—

The graft copolymer species with which one embodiment of this invention is concerned, consists of a main chain of polymer A, and side chains of polymer B grafted thereto, represented below:

B
B
B
B
B
B

—AAAAAAAAAAAAAA—

B
B
B
B
B
B
B
B
B

The characteristic of this copolymer type is that its gross properties remain predominantly those of the polymer (A) forming the molecular backbone. However, modifications can be produced via polymer (B) grafts, in most cases, without loss of the original desirable properties. As an example, conventional copolymers usually have a lower melting point than those of either component, while graft copolymers usually retain the high melting point of the pure backbone component. The structure and preparation of some examples of these copolymer types is discussed in a comprehensive review article by E. H. Immergut and H. Mark in Macromolekulare Chimie 18/19, 322–341 (1956).

Application of modifier

The addition polymerizable monomer may be applied to the plexifilament by immersion, padding, calendering, spraying, exposure to vapor condensation, or by other similar means. It is sometimes desirable to remove excess liquid by squeezing prior to exposure to irradiation. Alternatively, the monomer may be deposited upon the plexifilament by flashing-off the solvent in which it is dissolved prior to application.

As described previously it is desirable that the modifier be applied to the substrate in a highly fluid condition; thus, application from solutions with a viscosity of the same order of magnitude as water are preferred. This permits completely coating each fibril of the plexifilament.

In its preferred embodiment, the process of the instant invention is directed to producing modifications throughout the bulk of the plexifilament substrate since the modifier, applied to the surface, usually penetrates therethrough; for modifiers which do not penetrate, modification is restricted to the surface. Thus, when the plexifilament is penetrated with the modifier prior to initiating the graft polymerization, modification of the structure extends at least through a substantial proportion of the body of the final product. Increased contact time and agitation are helpful in increasing penetration. It is sometimes beneficial to carry out the soaking for penetration at elevated temperatures, at superatmospheric pressure or in the presence of swelling agents, dye carriers, or the like. However, elevated temperatures are to be avoided when using modifiers, such as strong acids, which may degrade hydrolysis-susceptible polymers. Minor amounts of wetting agents, surface active compounds, and the like are useful for improving penetration efficiency.

When it is desirable to limit penetration of the polymerizable monomer to a zone near the substrate surface, this may be accomplished by reduced contact time or temperature, or use of monomer modifiers with greater chain length. Alternatively, the shaped substrate may be exposed to the monomer modifier for the time required to effect the desired penetration, then penetration may be stopped by freezing, for example, with Dry Ice. The combination may then be irradiated while frozen, and grafting will occur when the combination is warmed.

Where the monomer modifier is applied from a solution, heptane is usually the preferred solvent. Other liquids are suitable for this purpose, however, such as alcohol, benzene, toluene, glycol, high boiling ethers and the like; where high soaking or irradiation temperatures are used, a nonvolatile solvent is often advantageous.

The flash-extruded plexifilament yarn is the preferred substrate to which the monomer modifier is grafted. The grafting step may be carried out with either drawn or undrawn yarn, fabrics, with the fiber slurry, or even (less desirable) in paper form.

Radiation which is effective

The ionizing radiation useful in the process of this invention must have at least sufficient energy to nonselectively break chemical bonds. This radiation is to be distinguished from ultraviolet radiation, which is effective in activating or ionizing only specific chemical bonds; such bonds are responsive to ultraviolet radiation only of a given wave length or wave lengths. It is often necessary to use an ultraviolet photo-initiator in such reactions, so that light of available wave lengths will initiate the desired chemical reaction. In contrast, the ionizing radiation of this invention has sufficient energy so that it exceeds that which is required to break any chemical bond. Thus, this ionizing radiation serves to activate polymer substrates so that chemical reactions are initiated with any organic compound, or, alternatively, to activate nonpolymerizable organic compounds so they react with the polymer substrate.

In general, ionizing radiation is preferred which has sufficient energy so that appreciable substrate thickness is penetrated, and, in addition, radiation absorption by the atmosphere is sufficiently low so that it is unnecessary to operate in a vacuum. Such radiation has energy of at least about 0.1 m.e.v. Higher energies are even more effective; the only known upper limit is imposed by available equipment.

The ionizing radiation of the process of this invention is generally considered in two classes: Particle radiation, and electromagnetic radiation. Effects produced by these two types of radiation are similar, since in their interaction with matter, each generates secondary radiation of the other type. The important consideration is that the incident radiation exceed a minimum threshold energy. Details of the mechanism of the interaction of high energy electrons with organic matter, including polymers, are not completely known, but the initial reaction is considered to be the absorption of energy by the valence electrons of the irradiated molecules in or near the path of the high energy electrons. The absorbed energy may be so great that some valence electrons will be shot off fast enough to ionize still other molecules. Some of the displaced electrons fall back to form neutral molecules and give up their energy as electromagnetic radiation, which in turn can be absorbed by other molecules and thus raise them to an excited stage. Further redistribution of the energy in the molecules results primarily in C—C bonds splitting off H atoms or molecules, producing free radicals or unsaturation.

The similarity of effect between the two types of radiation is thought to be due to the fact that an electron is ejected when an atom absorbs a quantum of high energy X- or gamma-rays; the electron has sufficient energy so that it in turn ejects electrons from other atoms, corresponding in effect to irradiation with an electron beam. Thus, the initial effect of high energy irradiation is to produce high energy electrons, which within the irradiated substrate produce free radicals. Consequently, the effects produced by particle and electromagnetic irradiation of equivalent energy are very similar, and differ only in the rate at which the effect is produced, which is a function of dose rate. The dose rate is a function of the equipment available to produce it, rather than an inherent limitation of the type of irradiation. Thus, with present day equipment, higher dose rates are obtainable with electron irradiation than are obtainable with X-rays of equivalent energy.

Although the fundamental particles differ from one another in size and charge, their mechanism of energy loss is essentially the same. Thus, their effect on chemical reactions is also similar. Although the neutron is not a charged particle, it, however, produces protons and gamma-rays which lose energy in the normal ways and consequently is effective in the process of this invention.

The heavier charged particles, like the electrons, undergo inelastic collisions with the bound electrons of atoms which they eject to produce ions. Some of these ejected electrons may be sufficiently energetic to produce ionizations of their own. The energy of all these particles is used up in removing the bonded electron (i.e., in ionization) and in producing excited atoms until all the electrons have become of such low energies that they can no longer produce ionizations and are captured to form negative ions. Neutrons do not produce ionization directly, but knock out protons from the nucleus of the atoms they traverse. The chemical effects of fast neutrons are, therefore, almost wholly due to protons in exactly the same way as the effects of X-rays are produced by the ejected electrons. Unlike the other ionizing radiations, however, the number of ionizations produced by neutrons depends largely on the nature of the elementary composition of the material through which the neutrons pass. The reason for this is that the transfer of energy between neutrons and protons does not depend on the atomic number but on other factors, such as chemical composition of the absorbing material.

Therefore, the high energy particle radiation effective in the process of this invention is an emission of highly accelerated electrons or nuclear particles such as protons, neutrons, alpha particles, deuterons, beta particles, or the like, directed so that the said particle impinges upon the polymer bearing the organic compound. The charged particles may be accelerated to high speeds by means of a suitable voltage gradient, preferably at least 0.1 m.e.v., using such devices as a resonant cavity accelerator, a Van de Graaff generator, a betatron, a synchrotron, cyclotron, or the like, as is well known to those skilled in the art. Neutron radiation may be produced by bombardment of selected light metal (e.g., beryllium) targets with high energy positive particles. In addition, particle radiation suitable for carrying out the process of the invention may be obtained from an atomic pile, or from radioactive isotopes or from other natural or artificial radioactive materials.

Similarly, ionizing electromagnetic radiation useful in the process of this invention is produced when a metal target (e.g., gold or tungsten) is bombarded by electrons possessing appropriate energy. Such energy is imparted to electrons by accelerating potentials in excess of 0.1 million electron volts (m.e.v.). Such radiation, conventionally termed X-ray, will have a short wave length limit of about 0.01 Angstrom unit (in the case of 1 m.e.v.) and a spectral distribution of energy at longer wave lengths determined by the target material and the applied voltage. X-rays of wave lengths longer than 1 or 2 Angstrom units are attenuated in air thereby placing a practical long wave length limit on the radiation. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases, the radiation is conventionally termed gamma-rays. While gamma radiation is distinguished from X-radiation only with reference to its origin, it may be noted that the spectral distribution of X-rays is different from that of gamma-rays, the latter frequently being essentially monochromatic, which is never the case with X-rays produced by electron bombardment of a target.

*Radiation energy*

To be efficient in the practice of the present invention, it is necessary that the high energy particles have sufficient velocities to permit penetration of several layers of material, when plexifilaments are being treated. Although an energy of about 50 e.v. is enough to initiate the grafting reaction, energies of at least 0.1 m.e.v. are preferred, for efficient penetration. The velocity required will depend on the nature of the particle and also on the nature of the substrate to a certain extent. Electrons accelerated by a potential of a million volts (m.e.v.) will effectively penetrate a thickness of polyhexamethylene adipamide fabric of about 0.25 cm. A more universal measure of penetration for all substrates is in units of grams penetrated per square centimeter irradiated. Thus, 2 m.e.v. electrons will effectively penetrate 0.7 gm./cm.$^2$ of any shaped article, while 1 m.e.v. electrons are effective for 0.35 gm./cm.$^2$.

As stated previously, there is no known upper limit to the particle energy, except that imposed by present day equipment. Thus, energies equivalent to 24 m.e.v. to 100 m.e.v. may be used.

As a guide in using other charged particles which have been shown to be effective in grafting, Table 12 shows particle energies required to give penetration equivalent to 0.1 m.e.v. electrons.

TABLE 12

| Particle: | Accelerating potential, m.e.v. |
|---|---|
| Electron, e | 0.1 |
| Proton, $H^+$ | 3.0 |
| Deuteron, $D^+$ | 4.0 |
| Alpha, $He^{++}$ | 12.0 |

It should be recognized that the heavier charged particles are especially adapted to creating surface effects, due to their lower penetration at a given energy. In situations where surface effects are paramount, it is not necessary that the shaped article be completely penetrated by the high energy particle and lower accelerations may be employed. Under those conditions, if the surface effect is to be applied to both sides of the article, it will obviously be necessary to expose each of the surfaces to the particle radiation. This is done by simultaneously bombarding both sides of the shaped article or alternatively by subjecting each side to the single source of irradiation during different runs.

High energy particle radiation has special utility for grafting modifiers to thin substrates, such as plexifilaments. The required irradiation doses with present day electron accelerators, such as exemplified herein, are attained rapidly, in a matter of seconds, thus promoting a high rate of throughput.

In comparison, high energy electromagnetic radiation in short wave lengths is highly penetrating, and hence readily lends itself to treating massive substrates. When grafting to the preferred substrates of this invention, this type of radiation is especially useful for irradiating materials present in multiple layers. For example, bolts of fabric, yarn packages, bales of staple fiber, or the like, may be irradiated as a single unit.

As an illustration, X-rays generated by electrons of 2 m.e.v. have adequate penetration for polymer samples of several inches in thickness. Lower energy (longer wave length) X-rays are, of course, less penetrating, so that it may be necessary to reduce the thickness of material to be treated simultaneously. In addition, the very long (soft) X-rays, because of low penetration may be especially effective in producing surface effects.

Although the treatment can be carried out using conventional X-ray equipment, the use of radioactive isotopes such as cobalt 60 is especially economical. Radiation from waste fission products, with particle irradiation screened off if desired, is also effective and offers an opportunity to utilize an otherwise useless waste product.

Radiation dose

In determining the optimum dose of irradiation for any particular combination, both the nature of the organic compound and the nature of the substrate must be considered. For example, for vinyl monomers which are readily graftable, and polymer substrates that are readily activated by ionizing radiation, it appears that the greater part of the minimum irradiation dose is required to consume the inhibitor (including oxygen) which may be present in the vinyl monomer. After that is done, relatively low additional doses will produce enough radicals to initiate graft polymerization. For readily graftable combinations of this type, a high polymerization rate is observed. Thus, the extent of irradiation-induced graft polymerization can be increased by increasing either radiation dose, post-irradiation time, or both. For instance, if a polymer soaked in acrylic acid solution is irradiated with a dose of 0.06 mrad, and the irradiated sample is kept in contact with the acrylic acid solution for 1 hour at room temperature, a large amount of the acid is grafted. In contrast, with same dose, if monomer is removed from the sample immediately after irradiation (e.g., by a water extraction), only one-third as much acrylic acid is grafted. Therefore, for polymerizable vinyl compounds and readily graftable polymer substrates, a very small dose is required; thus a minimum dose of 5000 rads (0.005 mrad) initiates a significant amount of grafting.

When unsaturated compounds which are not homopolymerizable (e.g., maleic acid) are used as the modifier, in combination with readily graftable substrates, doses of 0.1 mrad are required to initiate appreciable grafting. Radiation doses below the minimum specified fail to initiate beneficial amounts of grafting within a practical length of time. This is due to the fact that the life of free radicals produced by the irradiation depends on a balance between competing (i.e., non-grafting) reactions and those which produce grafting. It is obvious, of course, that even lower doses may be used in completely inhibitor- and oxygen-free systems, or if irradiation-initiation of grafting is supplemented by a chemical initiator.

Although the minimum doses specified are effective, higher dosages may be used and are usually highly beneficial. Dosages so high that substantial degradation of the shaped substrate occurs must obviously be avoided. High doses cross-link some polymers, which may sometimes be undesirable. In general, plexifilaments produced from polyethylene may be irradiated to a dosage as high as 100 mrad. However, it is preferred that the dosage applied to these substrates not exceed about 50 mrad.

The distinction between "available irradiation" and "dose" should be recognized. The 2 m.e.v. Van de Graaff electron accelerator used in many of the examples, operated as described, provides 12.5-watt seconds of irradiation per $cm.^2$ of substrate, per pass. For thin, organic polymer substrates (i.e., having a thicknesss of a few millimeters or less), the dose (energy absorbed) is about 1 mrad. Since much of the energy of the incident beam is not absorbed, several (fabric) samples may be irradiated simultaneously, each absorbing a dose of 1 mrad. Thicker substrates may absorb substantially all of the incident radiation energy, but the dose absorbed in the layers more distant from the electron source may not be sufficient to form a useful number of free radical sites.

Reaction conditions

Once free radicals are produced on the carbon atoms of the polymer chain in the presence of a vinyl monomer, vinyl polymerization is initiated, and polyvinyl chains grow from the initiating sites. However, it has been observed that the life of free radicals is many times greater than has been found in vinyl polymerizations carried out in solution or emulsions. For this reason, at a given radiation dose, the yield of polymer grafted to the shaped substrate is much greater than would be obtained, for example, if the substrate polymer were dissolved in the vinyl monomer and the solution irradiated.

The average molecular weight of the grafted polymer chains (at a given constant weight gain) may be controlled by adjusting the radiation dose. It may also be adjusted by controlling chain transfer to the substrate polymer, e.g., by changing grafting temperatures, or modifying the substrate polymer by incorporating copolymer components which are more (or less) susceptible to chain transfer. Similarly, the molecular weight distribution of the grafted polymer chains may be adjusted. By controlling the number, length and length distribution of grafted chains, the effect produced by a given grafting agent may be modified.

It has been observed that irradiation of the modifier-treated shaped substrate in the presence of air or moisture may occasionally cause some degradation; such adverse effects can be avoided by employing an atmosphere of inert gas around the article while it is being irradiated. Alternatively, a satisfactory and simpler approach is to wrap the sample in a material which is substantially air and water impervious, thus limiting the quantity of air or moisture contacting the sample. Complete exclusion of oxygen is not required, although it may contribute to grafting efficiency when using a vinyl monomer. In some of the examples, the samples are wrapped in polyethylene film. Aluminum foil is satisfactory. The nature of such wrapping material is not critical, provided it is substantially impervious to air and moisture, when required, and is readily penetrated by the radiation.

Irradiation conditions

It is within the scope of this invention to include in the combination to be irradiated, materials which may have a protective or antioxidant effect in preventing radiation degradation of either modifier or substrate or both. Compounds of this type are cysteine, carbon, polyethylene glycols and the like. It is also within the scope of this invention to include in the combination to be irradiated materials which absorb radiation and transmit the energy thus absorbed to the modifier or the organic polymeric material or both, whereby adhering is promoted and the efficiency of utilization of the radiation is increased. Compounds with this property are somewhat similar to sensitizers in photography, except that in this case useful materials absorb high energy radiation and emit the energy in a lower or more usable range. Phosphor screens containing calcium tungstate, zinc sulfide or metallic lead or the like have utility for this purpose. The phosphor materials may be used as plates contacting the material being treated, or may be incorporated in the modifying agent or even be coated on or dispersed in the organic polymeric material which it is desired to modify.

The irradiation may be accomplished over a wide range of temperatures. However, a low temperature decreases the tendency toward oxidation. Since the absorption of particle radiation frequently causes a temperature increase in the range of about 2° C. for each mrad absorbed, if high tube current is employed so that radiation absorption is complete within a short time interval, it is usually advisable to provide means to remove the heat generated to avoid injury to the sample. The use of Dry Ice to maintain a cold atmosphere is very satisfactory for this purpose. In general, irradiation at a higher temperature promotes the speed with which bonding occurs, thus promoting a higher throughput of a given piece of equipment at a constant radiation dosage. Temperatures ranging from −80° C. or below up to the melting point of the polymer substrate may be employed. More efficient grafting is often noted when irradiation temperatures are in the range of 100 to 160° C.

In general, for the greatest weight of modifier grafted for a given dose, the organic compounds are applied to the substrate as liquids or solutions, the solutions being of relatively high concentration. Such procedure provides the maximum opportunity for the organic compound to be bombarded by the high energy particle. At times, the concentration of the organic compound on the substrate will noticeably affect the final properties.

Prior to treatment, the plexifilament may be oriented by hot or cold drawing. It may contain additives such as pigments, antioxidants, fillers, polymerization catalysts and the like. After the irradiation, the product may be after-treated. Frequently a certain amount of decomposition occurs at the surface which is readily removed by washing in detergent. In other after-treatments, the article may be dyed, bleached, hot or cold drawn, chemically reacted, or given coatings of lubricants, sizes or the like or other similar treatments.

Although the grafting reaction has been described as a batch operation, it may also be carried out continuously either supplementary to or preferably, as a separate operation from flash-spinning.

Utility

The process of the present invention is valuable in creating both surface and bulk effects upon plexifilaments produced from synthetic organic polymers. It may be employed upon textiles to affect softness, resilience, tendency to shrink, static propensity, resistance to holemelting, pilling, hydrophilicity, wickability, and the like. It is useful in changing such properties as tenacity, elongation, modulus, creep, compliance ratio, work recovery, tensile recovery, decay of stress, wet properties, high-temperature properties, abrasion and wear resistance, moisture regain, flex life, hydrolytic stability, heat-setting properties, boil-off shrinkage, dry-cleaning properties, heat stability, light durability, zero strength temperature, melting point, soilability, ease of soil removal, laundering properties, wash-wear properties, liveliness, crease resistance, crease recovery, torsional properties, hysteresis properties, fiber friction, dyeability (depth, rate, permanence and uniformity), printability, washfastness of dyes or finishing treatments (resins, ultra-violet absorbers, etc.), handle and drape properties (stiffening or softening), heat-yellowing, snag resistance, elasticity, density, ease in textile processability, solubility (insolubilization or increase in solubility), bleachability, surface reactivity, delustering action, drying properties, fabric life, crimpability, stretchability, fabric stabilization, compressional resilience (rugs), thermal and electrical conductivity, transparency, light transmittance, air and water permeability, fabric comfort, felting, ion exchange properties, germicidal properties, adhesion, over-all appearance and combinations of these as well as others.

In addition to the above modifications which it may be desirable to effect in plexifilaments for textile uses, there are other modifications which are particularly useful when the plexifilaments are used in papers. Typical modifications improve dispersibility, ion exchange properties, strength (wet or dry), tear resistance, durability, burst resistance, vapor permeability, dyeability, abrasion resistance, fold resistance, light durability, heat durability, flame resistance, and many other properties.

The grafted products of this invention may be used in a wide range of compositions with kraft or other pulps to make useful paper products. In addition, the grafted products are suitable for making 100% synthetic fiber paper. Especially useful compositions are obtained by blending acid-grafted and unmodified flash-spun fiber.

The plexifilaments of the present invention are particularly suitable as binders for other fibrous materials. The plexifilament particles can be bonded intimately to a stress-bearing component as illustrated above. This stress-bearing component is preferably a material melting higher than the plexifilaments. Thus the final bonding conditions depend almost entirely on the nature of the plexifilaments. Typical stress-bearing components are: kraft or other cellulosic pulps, cellulosic fibers, glass, man-made fibers such as those from cellulose acetate, rayon, polyesters, polyamides, polyethers, polyvinyl chloride, polyureas, polyurethanes, acrylonitrile polymers, poly(tetrafluoroethylene), polysulfonamides, polyphosphonamides, hydrocarbon polymers of the linear or branched variety, etc. or copolymers or blends of polymers as well as grafted copolymers.

Of course, the stress-bearing fibers can vary widely in their denier range. The fiber denier will be selected to suit the intended end use for the sheet product made. The fibers are cut into staple lengths, which also can vary widely with the desired end product, but generally fall within the range of from ⅛″ to about 2″.

Any of the well-known raw cellulosic materials can be used to prepare the cellulosic-containing papers as described in the present application. These sources include wood, cotton and linen rags, cotton linters or staple, bagasse, bamboo, manila rope, esparto, cereal straws, flax, straw, bast, ramie, sisal, hemp, and waste paper. Of these, the pulps which are capable of making strong sheets, such as kraft, manila, bleached sulfite pulp and bleached sulfate pulp are preferred.

A grafted plexifilament pulp can be de-watered to a composition containing 20% or more of solids suitable for shipping and redispersing. This pulp can be diluted to the proper level for the formation of homo-sheets, it can be blended with other pulps of stress-bearing fibers to form hetero sheets of any desired characteristic. The pulp can also contain or can be blended with additives as listed earlier but, for good sheet formation in the processing steps, at least about 3% of grafted plexifilaments based on the total content of solids is recommended. Generally sheets containing at least about 5% grafted plexifilaments are preferred.

The sheet products of the present invention are useful in many applications. They can be made of various thicknesses or basis weights, the latter usually being within the range of from 0.5 to 30 oz./yd.$^2$. Such sheets include products which would be considered lightweight papers as well as heavy structures similar to cardboard. An important use for the pressed products of heavy basis weight is in the formation of containers, such as those used for butter, cheese and milk. The sheets of the present invention can be used in many packaging applications where cellulosic paper bags or perforated polyethylene films are now being used, particularly for packaging goods which are stored or handled occasionally out of doors. Such bagging materials include mail bags, cement bags, vegetable containers, etc., in other words, uses where wet strength is of importance. In such end uses, the products of the present invention would replace much heavier constructions such as impregnated fabrics, coated cardboards, or wooden boxes. The thinner sheets containing grafted plexifilaments of the present invention may be used as battery separators and as electrical papers in condensors, particularly when made entirely from synthetic ingredients. They may also be used for wrapping electric cables. In general, such products have high electrical insulation values, good thermal stability, very high wet strength, exceptionally good hot-wet properties, good heat insulation values, and many other valuable properties. The structures containing cellulosic components are superior in wet strength to sheet products made entirely from cellulosic materials when compared to one another calculated on the same basis weight. The sheet products made entirely from grafted synthetic polymers according to the present invention have a very favorable cost-performance ratio when strength, wet strength, tear strength, burst strength, electrical and heat insulation, corrosion, micro-organism influence, etc., factors are involved.

Other articles which can be made advantageously from the above compositions include anode bags, high performance printable papers, foil papers, filter papers and other filter media, absorbent products, low-cost tarpaulins, construction covers, parachutes, laminates, paper dishes, utility clothing, inner liners, head liners, etc.

The paper-making process may, of course, be carried out continuously on conventional paper machinery. Although dispersing agents are usually unnecessary in the acid-grafted plexifilamentary polymer slurry, such may be included, without harmful effect. Other conventional additives may also be employed, such as sizes, fillers, and the like.

Many other modifications will be apparent to those skilled in the art from a reading of the above description without a departure from the inventive concept.

What is claimed is:

A graft copolymer, flash-spun plexifilament comprising (a) a substrate of a yarn-like strand of a three-dimensional fibrous integral plexus of linear polyethylene and graft copolymerized thereto, (b) from about 10% to about 120% by weight, based on polyethylene, of acrylic acid.

References Cited by the Examiner

UNITED STATES PATENTS

| | | | |
|---|---|---|---|
| 2,441,085 | 5/1948 | Schneider | 8—115.5 |
| 2,678,293 | 5/1954 | McMillan et al. | 161—168 |
| 2,746,088 | 5/1956 | Lindemann et al. | 161—168 |
| 2,837,496 | 6/1958 | Vandenberg. | |
| 2,999,772 | 9/1961 | Burk et al. | |
| 3,040,507 | 8/1962 | Stanton et al. | |
| 3,081,519 | 3/1963 | Blades et al. | 264—209 X |
| 3,090,664 | 5/1963 | Cline et al. | 8—115.5 |

OTHER REFERENCES

C and EN News: p. 51, August 11, 1958.

ALEXANDER WYMAN, *Primary Examiner.*

NORMAN G. TORCHIN, JACOB STEINBERG,
*Examiners.*

H. WOLMAN, A. J. SMEDEROVAC, R. A. FLORES,
*Assistant Examiners.*